United States Patent [19]

Takaoka et al.

[11] Patent Number: 4,626,618

[45] Date of Patent: Dec. 2, 1986

[54] DC ELECTRIC POWER CABLE

[75] Inventors: Michio Takaoka, Chiba; Tsuneaki Motai, Yachiyo; Motoyuki Ono, Sakura; Shotaro Yoshida, Tokyo; Toshio Niwa, Yachiyo; Toru Takahashi, Tokyo; Keiichiro Kataoka, Ichikawa; Hiroshi Yamanouchi, Tokyo, all of Japan

[73] Assignee: Fujikura Ltd., Tokyo, Japan

[21] Appl. No.: 730,224

[22] Filed: May 3, 1985

[30] Foreign Application Priority Data

May 8, 1984 [JP] Japan .................. 59-91520

[51] Int. Cl.$^4$ .............................. H01B 9/02
[52] U.S. Cl. .................. 174/105 SC; 174/102 SC; 174/106 SC; 428/368
[58] Field of Search ............... 174/102 SC, 105 SC, 174/106 SC, 120 SC; 252/511; 428/368, 372, 379, 383

[56] References Cited

U.S. PATENT DOCUMENTS

| | | | |
|---|---|---|---|
| 3,660,592 | 5/1972 | Anderson | 174/102 SC X |
| 3,818,412 | 6/1974 | Deardurff | 174/102 SC X |
| 4,075,421 | 2/1978 | McCullough | 174/120 SC |
| 4,328,139 | 5/1982 | Simons | 252/606 |
| 4,384,944 | 5/1983 | Silver et al. | 428/383 |
| 4,400,580 | 8/1983 | Yamanouchi et al. | 174/120 SC X |
| 4,421,678 | 12/1983 | Mehta | 252/511 |
| 4,493,788 | 1/1985 | Fujie et al. | 252/511 |
| 4,525,297 | 6/1985 | Yamane et al. | 252/511 |
| 4,526,952 | 7/1985 | Zeitler et al. | 252/511 X |

FOREIGN PATENT DOCUMENTS 1694559 7/1971 Fed. Rep. of Germany .

Primary Examiner—Arthur T. Grimley
Assistant Examiner—Morris H. Nimmo
Attorney, Agent, or Firm—Sprung Horn Kramer & Woods

[57] ABSTRACT

A DC power cable includes a conductor and an insulation of a thermoplastic resin formed around the conductor. The insulation contains carbon black in an amount of about 0.2 to about 5% of the total weight of the thermoplastic resin and the carbon black, and the ratio of mineral oil absorption (cc/100 g) to specific surface ($m^2/g$) in the carbon black is not less than 0.7. The carbon black has the hydrogen content of not more than 0.6% by weight. The specific surface is measured by BET equation. The carbon black has a particle size of 10 to 100 nm.

9 Claims, 1 Drawing Figure

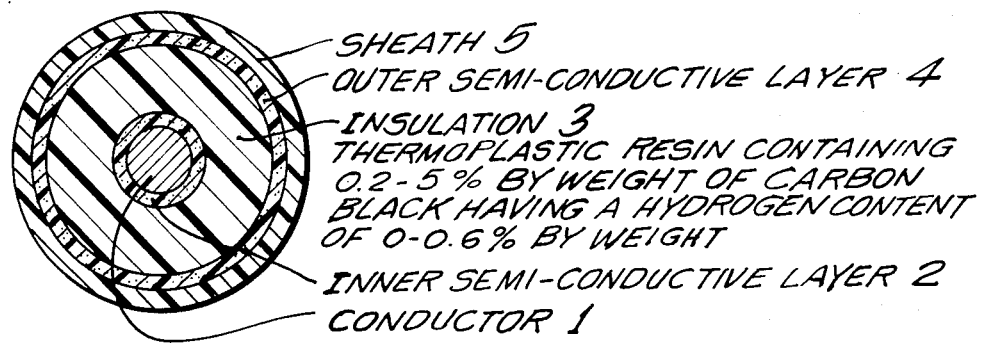

DC ELECTRIC POWER CABLE

BACKGROUND OF THE INVENTION

1. Field of the Invention

This invention relates to a DC electric power cable.

2. Prior Art

Polyethylene and cross-linked polyethylene have heretofore been extensively used as an insulation for a DC power cable since they are superior in dielectric strength and other dielectric characteristics. However, in the case where such a cable having an insulation of either polyethylene or cross-linked polyethylene is used as a high-voltage power transmission line, some difficulties are encountered. The most serious of these is that when the cable is supplied with a high DC voltage, long-lasting space charge tends to be produced in the insulation. It is generally considered that this space charge has the nature of electron, hole or ion and that such space charge results from the charge entrapped in those portions of the polyethylene insulation contributing to the formation of a crystal structure thereof. Polyethylene has good insulating properties and is non-polar, so that the entrapped charge can not easily be escaped from said those portions to form the long-lasting space charge. When such space charge is accumulated in the insulation of polyethylene upon application of DC voltage to the cable, the electric field intensity is increased adjacent to the conductor of the cable, so that the breakdown voltage of the cable is disadvantageously lowered.

SUMMARY OF THE INVENTION

With the above deficiencies in view, it is an object of this invention to provide a DC power cable of the type in which the accumulation of space charge in the insulation is reduced to enhance the dielectric strength of the insulation to thereby eliminate adverse effects on the insulation.

According to the present invention, there is provided a DC power cable which comprises a conductor and an insulation formed around the conductor, the insulation comprising a thermoplastic resin and carbon black, the carbon black being about 0.2 to about 5% of the total weight of the thermoplastic resin and the carbon black, the ratio of mineral oil absorption (cc/100 g) to specific surface ($m^2/g$) in the carbon black being not less than 0.7, and the carbon black having the hydrogen content of not more than 0.6% by weight. The specific surface is measured by BET equation. The carbon black has a particle size of 10 to 100 nm. With this construction, the accumulation of the space charge in the insulation can be reduced to a satisfactory level to eliminate undue irregularities in electric field exerted on the insulation, so that DC breakdown voltage of the cable can be increased, thereby improving dielectric resistance of the cable.

BRIEF DESCRIPTION OF THE DRAWING

The FIGURE is a sectional view of a cable in accordance with the present invention.

DESCRIPTION OF THE PREFERRED EMBODIMENT OF THE INVENTION

As shown in the FIGURE, a DC power cable comprises a conductor 1, an inner semi-conductive layer 2 formed on the conductor, an insulation layer 3 formed on the inner semi-conductive layer, an outer semi-conductive layer 4 formed on the insulation layer, and a sheath 5 formed on the outer semi-conductive layer. The insulation layer is made of a thermoplastic resin. The insulation layer contains carbon black in an amount of about 0.2 to about 5% of the total weight of the thermoplastic resin and the carbon black. The ratio of mineral oil absorption (cc/100 g) to specific surface ($m^2/g$) in the carbon black is not less than 0.7. The carbon black has the hydrogen content of not more than 0.6% by weight and has a particle size of 10 to 100 nm.

The specific surface is measured by BET equation. The specific surface of the carbon black represents an amount of absorption of a specified substance (for example, $N_2$ or Ar) per gram of the carbon black, and is expressed in terms of $m^2/g$. This procedure is used since it is difficult to measure the surface area of each particle of the carbon black.

The oil absorption merely implies the amount of absorption of oil in the carbon black, and the particle structure of the carbon black can be realized from the oil absorption.

The thermoplastic resin of which the insulation layer is made includes polyethylene such as low-density polyethylene and high-density polyethylene, polypropylene, ethylene vinyl acetate copolymer (EVA), ethylene ethyl acrylate copolymer (EEA), ethylene propylene rubber (EPR) and a mixture of at least two of these substances. Also, these substances can be used in the cross-linked form.

Examples of the carbon black contained in the thermoplastic resin include SAF carbon, acetylene carbon, ISAF carbon, I-ISAF carbon, CF carbon, SCF carbon and HAF carbon.

With the above-mentioned construction, leakage of space charge in the insulation layer is enhanced. The reason for this will now be described.

Resistivity (specific resistance) $\rho$ ($\Omega$-m) of the insulation layer is represented by the following formula (1):

$$\rho = \rho_0 e^{-\alpha T} e^{-\beta E} \qquad (1)$$

wherein $\alpha$ is a temperature coefficient ($°C.^{-1}$) of the insulation layer, $\beta$ is a coefficient of electric field (a stress coefficient of the insulation layer) (mm/kV), and E is the electric field (kV/mm) exerted on the insulation layer.

The addition of carbon black to the insulation increases the electric field coefficient $\beta$ while the temperature coefficient $\alpha$ is decreased, thereby promoting the leakage of the space charge from the insulation layer. The reason is that when the electric field coefficient $\beta$ is increased, the resistivity $\rho$ is decreased, so that the electric field at the high stress portion of the insulation layer on which a high electric field is exerted is reduced in intensity, and also when the temperature coefficient $\alpha$ is decreased, the maximum electric field Emax, appearing on the side of the cable sheath when the temperature of the conductor is high, is decreased. Thus, the electric field profile in the insulation layer is inclined toward a uniformity, so that the accumulation of the space charge in the insulation reduced.

(1) The carbon black content should be in the range of about 0.2 to about 5% by weight. If the carbon black content is below 0.2%, the above-mentioned advantages can not fully be achieved. On the other hand, if the carbon black content is above 5%, the reduction of the resistivity $\rho$ and the increase of the electric field coefficient $\beta$ are excessive, so that a thermal breakdown of the insulation may occur.

(2) The ratio of oil absorption to specific surface should be not less than 0.7. When the amount of addition of carbon black is increased, the distance between adjacent particles thereof becomes shorter so that electric current flows between the particles under a high electric field due to a tunnel effect. As a result, the electric field coefficient $\beta$ becomes unduly high, thereby inviting a thermal breakdown of the insulation. Therefore, it is of absolute necessity that the resistivity $\rho$ represented by the formula (1) should be kept to a low level with a reasonably low content of the carbon black. Also, in the case where the carbon black is a furnace black, the ratio of oil absorption to specific surface should be not more than 3.5. If the ratio exceeds this level, the apparent particle size of the carbon black is increased, so that the carbon black can not be efficiently mixed with the polyethylene. Particularly, in the case of acetylene carbon, this tendency is marked, since the particles are linked in a chain-like manner.

When one of SAF carbon, ISAF carbon, I-ISAF carbon, CF carbon, SCF carbon and HAF carbon is used as the carbon black, the above ratio is in the range of between 0.7 and 1.5.

The carbon black having a higher ratio of oil absorption to specific surface can decrease the resistivity $\rho$ in smaller amount. When this ratio is not less than 0.7, satisfactory results can be achieved.

(3) The carbon black should have the hydrogen content of not more than 0.6% by weight. If the hydrogen content is too great, too many $\pi$ electrons are present in the insulation, so that the electrons can not be smoothly moved. As a result, much carbon black must be added to the thermoplastic insulation material so as to achieve the desired resistivity $\rho$. This is not desirable for the reasons mentioned in the above Item (2). Therefore, the lower the hydrogen content is, the better. And, the hydrogen content of not more than 0.6% achieves satisfactory results.

(4) The carbon black should have a particle size of 10 to 100 nm. Within this range, the crystalline structure of the polyethylene is not disturbed, and when the crystalline structure is disturbed, electrical characteristics of the cable are adversely affected. If the particle size exceeds this range, the carbon is not dispersed in the thermoplastic resin effectively. The use of the carbon black having a particle size below this range is not practical.

(5) The carbon black should contain not less than 97% by weight of carbon. The higher the carbon content is, the better. The carbon black may contain as impurities ash, $O_2$ and $H_2$, and if the content of such impurities is increased, electrical characteristics are adversely affected.

The invention will now be illustrated by way of Example.

EXAMPLE

Sample DC power cables 1 to 12 of this invention and comparative DC power cables 13 and 14 were prepared by the steps of simultaneously forming an inner semi-conductive layer, an insulation layer and an outer semi-conductive layer on a conductor by extrusion. The insulation layer interposed between the inner and outer semi-conductive layers had a thickness of 3 mm, and the conductor had a circular cross-sectional area of 200 $mm^2$.

Each of the insulation layers was made of polyethylene having the carbon black content shown in TABLE below. The carbon black added to the polyethylene had a particle size of 10 to 100 nm. Particularly, the carbon black contained in the insulation of each of the sample cables 9 and 10 was SAF carbon, and the carbon black contained in the insulation of each of the sample cables 11 and 12 was acetylene carbon.

Each of the sample cables were subjected to a DC breakdown test. The results obtained are also shown in TABLE.

As can be seen from TABLE, the sample cables 1 to 12 of this invention exhibited much improved DC breakdown voltage.

TABLE

| Sample No. | CB PE + CB (%) | Oil absorption Specific surface | Hydrogen content of CB (%) | DC breakdown voltage (KV/mm) |
|---|---|---|---|---|
| 1 | 0.8 | 0.99 | 0.33 | 112 |
| 2 | 1.5 | " | " | " |
| 3 | 3.0 | " | " | 96 |
| 4 | 5.0 | " | " | 72 |
| 5 | 0.2 | 4.16 | 0.08 | " |
| 6 | 0.4 | " | " | 112 |
| 7 | 0.8 | " | " | 104 |
| 8 | 1.5 | " | " | 96 |
| 9 | 0.8 | 0.99 | 0.33 | " |
| 10 | 1.5 | " | " | " |
| 11 | 0.4 | 4.16 | 0.08 | 92 |
| 12 | 0.8 | " | " | 84 |
| 13 | 0 | | | 72 |
| 14 | 8.0 | 0.99 | 0.33 | 48 |

*CB means carbon black

What is claimed is:

1. A DC power cable comprising a conductor and an insulation of a thermoplastic resin formed around said conductor, said insulation containing about 0.2 to about 5% by weight of carbon black, the ratio of mineral oil absorption (cc/100 g) to specific surface ($m^2$/g) in said carbon black being not less than 0.7, and said carbon black having the hydrogen content of not more than 0.6% by weight.

2. A DC power cable according to claim 1, in which said carbon black has a particle size of 10 to 100 nm.

3. A DC power cable according to claim 1, in which said thermoplastic resin of which said insulation layer is made is selected from the group consisting of polyethylene such as low-density polyethylene and high-density polyethylene, polypropylene, ethylene vinyl acetate copolymer (EVA), ethylene ethyl acrylate copolymer (EEA), ethylene propylene rubber (EPR).

4. A DC power cable according to claim 1, in which said thermoplastic resin is in the crosslinked form.

5. A DC power cable according to claim 1, in which an inner semi-conductive layer is formed on the conductor, said insulation layer being formed on the inner semi-conductive layer, an outer semi-conductive layer being formed on the insulation layer, and a sheath formed on the outer semi-conductive layer.

6. A DC power cable according to claim 1, in which said carbon black contains not less than 97% by weight of carbon.

7. A DC power cable according to claim 1, in which said carbon black is a furnace black, said ratio of oil absorption to specific surface being not more than 3.5.

8. A DC power cable according to claim 1, in which said carbon black is selected from the group consisting of SAF carbon, ISAF carbon, I-ISAF carbon, CF carbon, SCF carbon and HAF carbon, said ratio of oil absorption to specific surface being not more than 1.5.

9. A DC power cable according to claim 8, in which said thermoplastic resin is polyethylene.

* * * * *